Jan. 7, 1958  D. A. BURNETT  2,818,909
SAFETY SEAT ASSEMBLY FOR VEHICLES
Filed Feb. 17, 1956  2 Sheets-Sheet 2
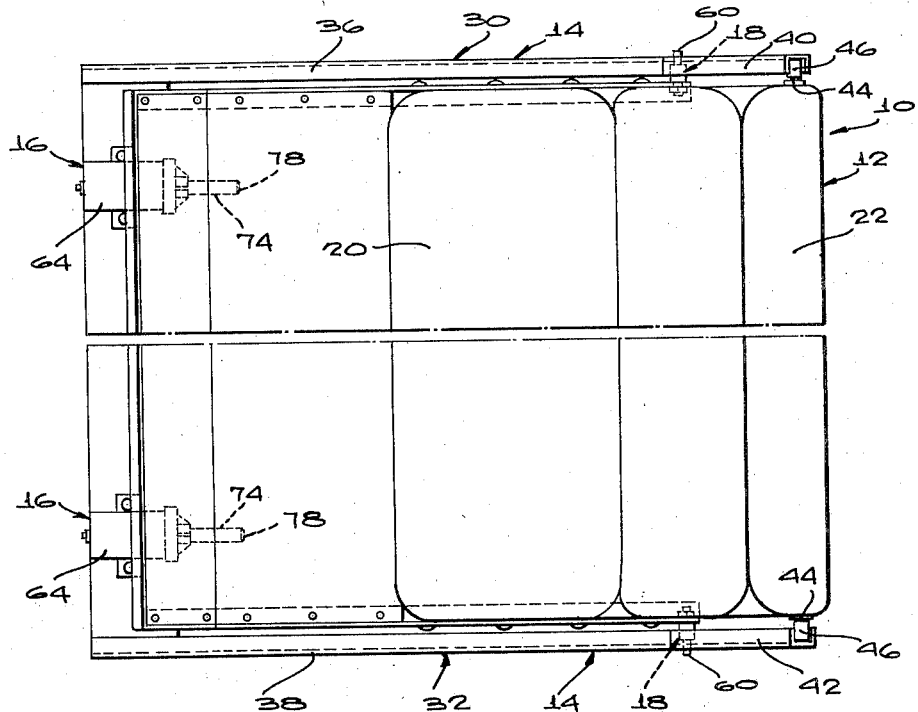
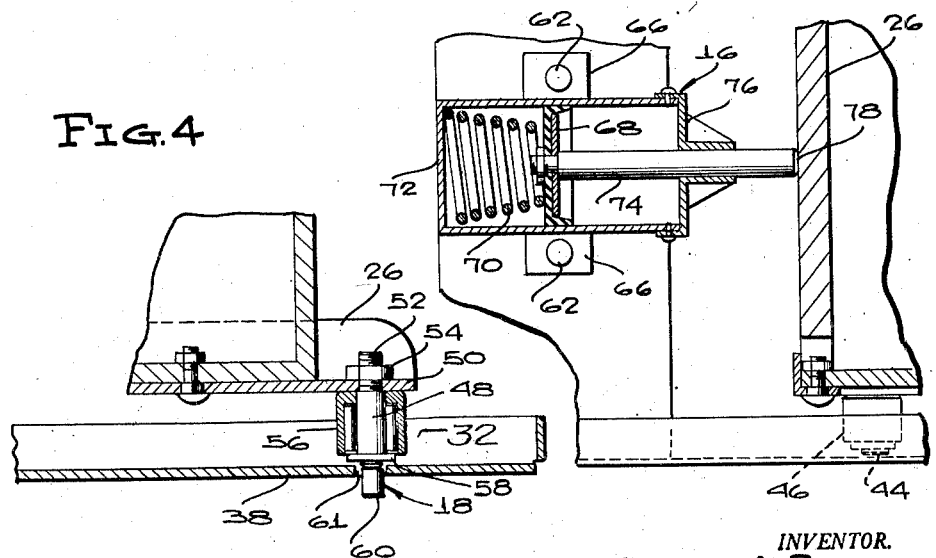
INVENTOR.
DANIEL A. BURNETT
BY
McMorrow, Berman + Davidson
ATTORNEYS _United States Patent Office_ 2,818,909
Patented Jan. 7, 1958

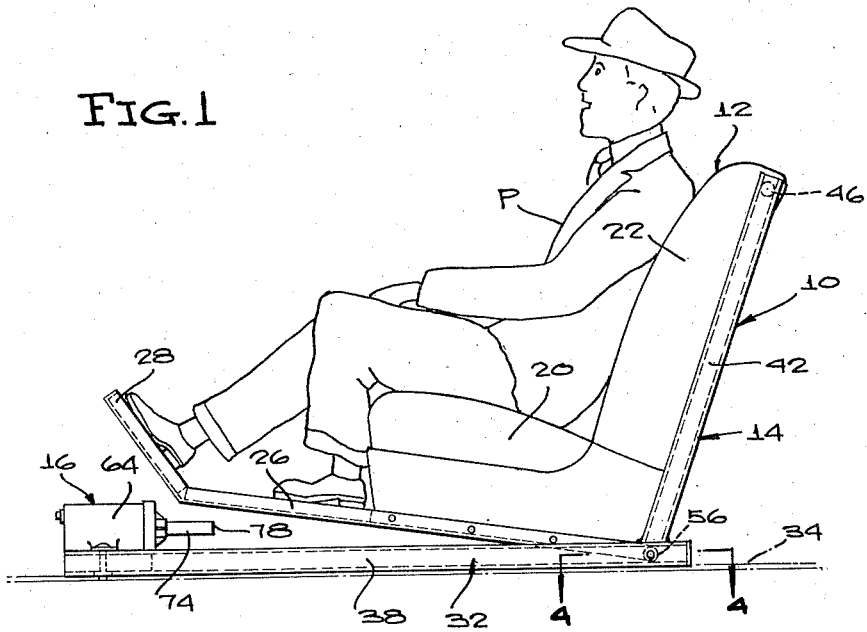
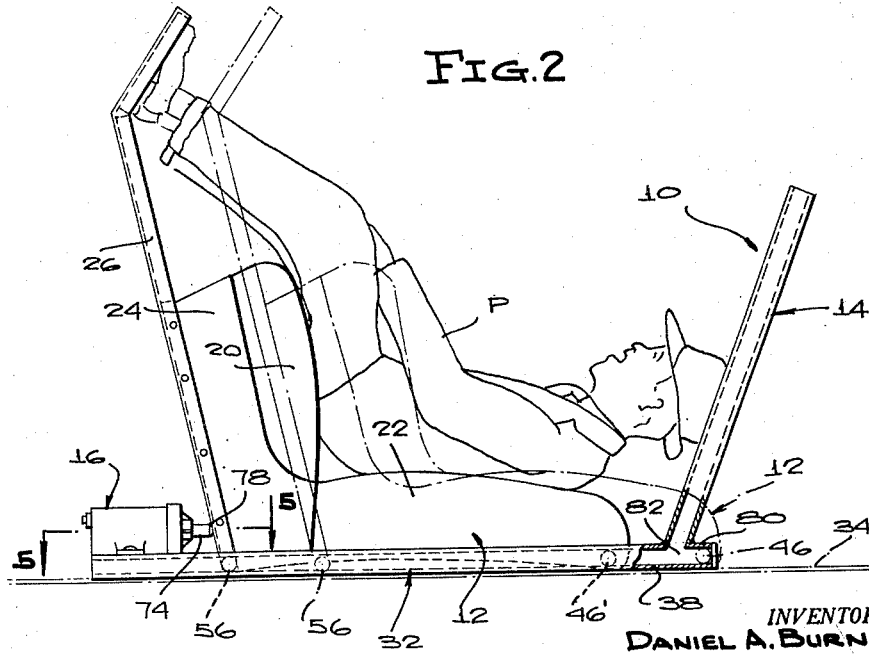

2,818,909

SAFETY SEAT ASSEMBLY FOR VEHICLES

Daniel A. Burnett, Bakersfield, Calif.

Application February 17, 1956, Serial No. 566,215

6 Claims. (Cl. 155—9)

This invention relates generally to vehicle safety devices and is more particularly concerned with a novel safety seat assembly for vehicles.

Due to the high rates of speed which present-day vehicles, such as passenger cars, aircraft, and the like, operate, the danger of being thrown forward due to the force of inertia on the passengers of the vehicle is always apparent during a collision thereof. Numerous means have been proposed for protecting the passengers and driver, for example, safety belts, various safety seat assemblies, padded interiors, etc., however, as a general rule none of these have proved satisfactory, and those which adequately protect a passenger, are relatively cumbersome and awkward to use, as well as being relatively expensive to install.

When a passenger is sitting upright in a fast moving vehicle in a forwardly facing seat including bottom cushion and back rest portions, the center of gravity is relatively high and accordingly the force of inertia on such a passenger during a collision is great accompanied by the increased danger of injury when thrown forward. However, it has been found that if the seats are reversed i. e. a vertical abutment or cushioning means is presented to impede the forward movement of the passenger, the danger of injury is appreciably reduced. Further, if the center of gravity of the passenger can be lowered he will not be thrown forward in a downward movement which often results in injuries to the head.

The primary object of invention is to provide a novel safety seat assembly for vehicles which is inertia actuated and including means for lowering the center of gravity of a passenger of the vehicle in which the safety seat is installed, including means for positioning the seat to absorb the force of inertia on the passenger thus obviating the inherent dangers due to collisions.

A further object of invention in conformance with that set forth is to provide a safety seat assembly of the character set forth which includes a seat assembly having bottom and back rest portions, guide track means disposed on opposite sides of the seat assembly said guide track means including track portions cooperating with guide means extending from the seat assembly whereby the force of inertia on a passenger disposed on the seat causes the seat to tilt or rotate upwardly in such a manner during an accident resulting in lowering the back rest portion of the seat assembly and presenting the bottom of the seat portion of the seat assembly as a vertical cushioning abutment portion wherein the force of the accident on the passenger is transmitted from his lower extremities to the seat assembly which might be said to be in a horizontally disposed position, and further including collision actuated retaining means engageable between the seat assembly and guide track means which is operative to retain the seat in a riding or vertically disposed position until actuated by a predetermined force above a given value when applied from the seat and passenger in a colliding vehicle.

Further objects of invention in conformance with that set forth are to provide a novel safety seat assembly of the character set forth which includes additional shock absorbing means engageable with the novel seat assembly when thrown forward due to a collision, and including frangible pin means extending from the seat assembly to the track guide means which will be severed or sheared due to a predetermined force above a given value during a collision.

Another object of invention in conformance with that set forth is to provide a novel safety seat assembly of the character set forth which is readily and economically manufactured, easily installed and maintained, and highly practical, serviceable, utilitarian and satisfactory for the purpose intended.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

Figure 1 is a side elevational view of the novel safety seat assembly, showing the seat and a passenger in a vertical or riding position, the seat being disposed on a fragmentary portion of a floor board of a vehicle and shown in phantom lines;

Figure 2 is a side elevational view similar to Figure 1, with portions broken away and shown in section for clarity, showing the position assumed by the passenger in the novel seat assembly after the safety seat assembly has been actuated during a collision;

Figure 3 is a top plan view of the novel seat assembly;

Figure 4 is an enlarged fragmentary sectional view taken substantially on line 4—4 of Figure 1, and Figure 5 is an enlarged fragmentary sectional view taken substantially on line 5—5 of Figure 2.

Referring to the drawings in detail, the novel safety seat assembly is indicated generally at 10 including a seat assembly 12, guide track means 14, shock absorbing means 16 and collision-actuated retaining means 18, see Figure 4.

The seat assembly 12 includes a bottom-seat portion 20 which is suitably upholstered continuing in a rearwardly inclined back or back-rest portion 22 which is also suitably upholstered. The seat assembly 12 conforms generally to conventional seats found in passenger vehicles, for example, however, it is to be understood that a safety seat assembly of the character involved could be readily utilized in aircraft, for example. The seat assembly 12 includes on the lower portion of the bottom seat portion 24 a suitably secured bottom panel 26 of any suitable material, which may conveniently include an angulated forward end portion 28 defining a foot rest portion for a passenger P. The panel 26 to be constructed of any suitable material, is conveniently disposed in a substantially upwardly angulated position thus aiding in the tilting of the seat assembly, as seen in Figure 2, during a collision.

The guide track means 14 includes a pair of guide track assemblies 30 and 32 which are disposed on opposite sides of the seat assembly 12 being suitably secured to the vehicle floor board 34. The guide track assemblies 30 and 32 include a lower guide track portion 36 and 38, respectively, which extend forwardly from the bottom-seat portion 20, said track portions being in intersecting communicating relationship with rearwardly inclined guide track portions 40 and 42, respectively. The guide track portions 36, 38, 40 and 42 have a U-shaped cross section, the track portions opening toward each other or toward the seat assembly 12.

Extending laterally from oppositely disposed upper end portions adjacent the upper end of the back 22 of the seat assembly 12 are suitably secured stub axles 44 which have journaled thereon roller elements 46 which are engageable within a U-shaped guide track portion. Extending in linear underlying relationship from a lower portion of the back rest 22 of the seat assembly 12 are removable stub shafts 48, see Figure 4, which extend through a suitably apertured vertical flange 50 of the plate 26, said stub shaft 48 having a reduced diameter threaded end portion 52 having mounted thereon a fastening nut 54 for securing said stub shaft 48 in a laterally extending relationship from the seat assembly 12. The shaft 48 has journaled thereon a suitable friction reducing roller element 56 which is retained in position on said shaft by means of an annular flange 58 integral with the shaft. The shaft 48 includes on the end opposite the threaded portion 52 a longitudinally extending frangible end portion 60 which extends through an aperture 61 to the guide track portions 36 and 38. The frangible end portion 60 is of sufficient strength to retain the seat assembly in the vertical or riding position seen in Figure 1 under ordinary riding conditions, however, during a collision the same will be sheared off wherein the roller elements will permit the seat assembly 12 to assume the position shown in Figure 2. The force of inertia acting on the passenger in the seat results in the roller element 56 moving forwardly in the guide track portion 38, and the roller element 46 moving downwardly in the guide track portion 42. Thus the passenger P is immediately lowered to the position shown in Figure 2 wherein the center of gravity of the passenger is closer to the floor board of the vehicle, and the force of a collision on the passenger is absorbed in the vertically disposed bottom-seat portion 20 of the seat assembly through the lower extremities of said passenger.

Suitably secured in spaced relationship by means of fastening bolts 62, for example, are the shock absorbing means 16 which comprise piston-and-cylinder assemblies including the cylinder 64 having suitable attaching lugs 66 engageable with the fastening bolts 62, see Figure 5, said cylinder having supported therein a piston assembly 68 having one end of a compression spring 70 in engagement therewith, the other end of the compression spring being in engagement with an inner surface portion of the wall 72 of the said cylinder. Suitably secured to a central portion of the piston 68 is a piston rod or force transmitting rod 74 which extends out of the other wall 76 of said cylinder. The end portion 78 of the force transmitting rod 74 is engageable with an undersurface portion of the plate 26 when the same is urged into the position shown in Figure 2, whereupon air contained in the portion of the cylinder in which the spring 70 is contained is compressed, and the spring 70 is also compressed, thus storing up the energy of the force of the shock on said shock absorber assembly. After the force of the collision has ceased, the shock absorbing means 16 by virtue of the energy stored up in the spring 70 will be sufficient to urge the seat assembly 12 into the dotted line position as shown in Figure 2. In this position it will be noted that the lower guide track portion 38 includes an extension portion 80 which is in linear alignment with portions 36 and 38 extending rearwardly from the intersection 82 of the guide portions 38 and 42. When the seat assembly 12 is urged into the position shown by the dotted lines in Figure 2, the extension portion 80 will be operative to prevent the seat from accidentally tilting upward, and when it is shown as designated by 46′ indicating the upper roller element, see Figure 2, the guide rail portion 38 will in this position also prevent the seat assembly from being tilted upwardly accidentally.

Thus operation of the novel safety seat assembly is believed to be readily apparent, and it is to be considered within the purview of invention that other collision actuated retaining means may be utilized in place of the frangible means shown. Furthermore, there has been disclosed a novel safety seat assembly which fully conforms with the objects of invention heretofore set forth.

Various positional directional terms such as "forward," "upper," "lower," etc., are utilized herein and have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A collision actuated safety seat assembly for vehicles comprising a seat assembly including a bottom-seat portion and a rearwardly inclined back-seat portion, guide track means secured on opposite sides of the seat assembly, said guide track means including a lower elongated guide track portion extending forwardly adjacent the bottom-seat portion of the seat assembly and an intersecting rearwardly-inclined elongated guide track portion extending adjacent the back-seat portion of said seat assembly, guide means secured in linear alignment on the back-seat portion, said guide means being slidably received in the lower and rearwardly inclined guide track portions permitting the back seat portion to tilt to a horizontally disposed position when moving forward on the guide track means, and collision-actuated retaining means extending between the seat assembly and the guide track means for retaining the seat in a vertical position against the force of inertia below a predetermined value.

2. A collision actuated safety seat assembly for vehicles comprising a seat assembly including a bottom-seat portion and a rearwardly inclined back-seat portion, guide track means secured on opposite sides of the seat assembly, said guide track means including a lower elongated guide track portion extending forwardly adjacent the bottom-seat portion of the seat assembly and an intersecting rearwardly inclined elongated guide track portion extending adjacent the back-seat portion of said seat assembly, guide means secured in linear alignment on the back-seat portion, said guide means being slidably received in the lower and rearwardly inclined guide track portions permitting the back seat portion to tilt to a horizontally disposed position when moving forward on the guide track means, collision-actuated retaining means extending between the seat assembly and the guide track means for retaining the seat in a vertical position against the force of inertia below a predetermined value, and shock absorbing means disposed between forward terminal end portions of the lower guide track portions for engaging a bottom portion of the seat assembly urged forward due to a collision.

3. A collision actuated safety seat assembly for vehicles comprising a seat assembly including a bottom-seat portion and a rearwardly inclined back-seat portion, guide track means secured on opposite sides of the seat assembly, said guide track means including a lower elongated guide track portion extending forwardly adjacent the bottom-seat portion of the seat assembly and an intersecting rearwardly inclined elongated guide track portion extending adjacent the back-seat portion of said seat assembly, guide means secured in linear alignment on the back-seat portion, said guide means being slidably received in the lower and rearwardly inclined guide track portions permitting the back seat portion to tilt to a horizontally disposed position when moving forward on the guide track means, collision-actuated retaining means extending between the seat assembly and the guide track means for retaining the seat in a vertical position against the force of inertia below a predetermined value, and shock absorbing means disposed between forward terminal end portions of the lower guide track portions for engaging a bottom portion of the seat assembly urged forward due to a collision, said shock absorbing means comprising a pair of spaced piston-and-cylinder assemblies disposed in spaced relationship between the lower guide track portions, said piston-and-cylinder assemblies including a longitudinally extending force transmitting rod engageable with a lower rear portion of said seat assembly when the same is urged forward in a horizontally disposed position.

4. A collision actuated safety seat assembly for vehicles comprising a seat assembly including a bottom-seat portion and a rearwardly inclined back-seat portion, guide track means secured on opposite sides of the seat assembly, said guide track means including a lower elongated guide track portion extending forwardly adjacent the bottom-seat portion of the seat assembly and an intersecting rearwardly inclined elongated guide track portion extending adjacent the back-seat portion of said seat assembly, guide means secured in linear alignment on the back-seat portion, said guide means being slidably received in the lower and rearwardly inclined guide track portions permitting the back seat portion to tilt to a horizontally disposed position when moving forward on the guide track means, collision-actuated retaining means extending between the seat assembly and the guide track means for retaining the seat in a vertical position against the force of inertia below a predetermined value, and shock absorbing means disposed between forward terminal end portions of the lower guide track portions for engaging a bottom portion of the seat assembly urged forward due to a collision, said lower guide track portion including an extension track portion extending linearly from the intersection of the lower and vertical guide track portions, and shock absorbing means including energy storing means for urging a guide means on the seat assembly into locking engagement with the extension track portion when the seat is disposed in a horizontally tilted position.

5. A collision actuated safety seat assembly for vehicles comprising a seat assembly including a bottom-seat portion and a rearwardly inclined back-seat portion, guide track means secured on opposite sides of the seat assembly, said guide track means including a lower elongated guide trick portion extending forwardly adjacent the bottom-seat portion of the seat assembly and an intersecting rearwardly inclined elongated guide track portion extending adjacent the back-seat portion of said seat assembly, guide means secured in linear alignment on the back-seat portion, said guide means being slidably received in the lower and rearwardly inclined guide track portions permitting the back seat portion to tilt to a horizontally disposed position when moving forward on the guide track means, and collision-actuated retaining means extending between the seat assembly and the guide track means for retaining the seat in a vertical position against the force of inertia below a predetermined value, said collision actuated retaining means comprising a frangible pin element extending between the seat assembly and a portion of the lower guide track portion.

6. A collision actuated safety seat assembly for vehicles comprising a seat assembly including a bottom-seat portion and a rearwardly inclined back-seat portion, guide track means secured on opposite sides of the seat assembly, said guide track means including a lower elongated guide track portion extending forwardly adjacent the bottom-seat portion of the seat assembly and an intersecting rearwardly inclined elongated guide track portion extending adjacent the back-seat portion of said seat assembly, guide means secured in linear alignment on the back-seat portion, said guide means being slidably received in the lower and rearwardly inclined guide track portions permitting the back seat portion to tilt to a horizontally disposed position when moving forward on the guide track means, and collision-actuated retaining means extending between the seat assembly and the guide track means for retaining the seat in a vertical position against the force of inertia below a predetermined value, said guide means comprising friction reducing roller elements journaled in a laterally extending spaced vertical relationship from the back-portion of the seat assembly, said guide track portions comprising C-shaped channel members opening toward each other for receiving therein the roller elements.

References Cited in the file of this patent

UNITED STATES PATENTS

| 2,102,979 | Smith | Dec. 21, 1937 |
| 2,509,362 | Miller | May 30, 1950 |
| 2,660,222 | Woodsworth | Nov. 24, 1953 |
| 2,712,346 | Sprinkle | July 5, 1955 |

FOREIGN PATENTS

| 151,161 | Germany | Oct. 25, 1937 |